(12) United States Patent
Samdani et al.

(10) Patent No.: US 7,978,756 B2
(45) Date of Patent: Jul. 12, 2011

(54) SYSTEMS AND METHODS FOR MONITORING IMPULSE NOISE

(75) Inventors: Hemant Samdani, New Delhi (IN); Kunal Raheja, Noida (IN); Rahul Garg, Faridabad Haryana (IN); Patrick Duvaut, Tinton Falls, NJ (US); Amitkumar Mahadevan, Eatontown, NJ (US); Robert A. Day, Manalapan, NJ (US); Robin Levonas, Holmdel, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 652 days.

(21) Appl. No.: 12/098,696

(22) Filed: Apr. 7, 2008

(65) Prior Publication Data

US 2009/0252234 A1 Oct. 8, 2009

(51) Int. Cl.
*H04B 3/46* (2006.01)
*H04B 17/00* (2006.01)
*H04Q 1/20* (2006.01)

(52) U.S. Cl. ........ 375/227; 375/284; 375/285; 375/346; 375/228; 375/257; 379/416; 702/69

(58) Field of Classification Search .................. 375/227, 375/228, 257, 284, 285, 346; 455/501, 63.1, 455/570; 379/416; 702/69
See application file for complete search history.

(56) References Cited

U.S. PATENT DOCUMENTS

| | | | |
|---|---|---|---|
| 6,885,730 B1 | 4/2005 | Bremer et al. | |
| 7,027,405 B1 | 4/2006 | Khadavi et al. | |
| 7,031,381 B1 | 4/2006 | Betts et al. | |
| 7,106,833 B2 | 9/2006 | Kerpez et al. | |
| 7,263,174 B2 | 8/2007 | Schmidt et al. | |
| 7,274,746 B2 | 9/2007 | Bailey et al. | |
| 7,443,916 B2 * | 10/2008 | Sedarat et al. | 375/260 |
| 2006/0253515 A1 * | 11/2006 | Sedarat | 708/446 |

OTHER PUBLICATIONS

Draft Amendment 2 to International Telecommunications Union (ITU-T), "Recommendation G.993.2, Very High Speed Digital Subscriber Line transceivers 2 (VDSL2)", Section 11.4.2.2, pp. 15-20, 2007.
"G.gen: G.vdsl: ADSL: Impulse Noise Monitoring: Performance Requirements", Source: Alcatel-Lucent, Document No: BF-070, Contribution to ITU-T, Bordeaux, France, Dec. 3-7, 2007.

(Continued)

*Primary Examiner* — Phuong Phu
(74) *Attorney, Agent, or Firm* — Thomas, Kayden, Horstemeyer & Risley, LLP

(57) ABSTRACT

Systems and methods for monitoring impulse noise are described. At least one embodiment is a method, which comprises detecting whether impulse noise is present and in response to detecting the presence of impulse noise, performing time domain analysis to determine whether one or more impulse noise sources are present based on minimum inter-arrival time and maximum impulse length. The method further includes performing frequency domain analysis to estimate frequencies associated with the one or more impulse noise sources and based on the time domain analysis and frequency domain analysis, providing a total number of impulse noise sources and frequencies associated with the impulse noise sources. In this regard, the embodiments described herein provide dual-speed monitoring of impulse noise in the form of short-term and long-term monitoring. The use of dual-speed monitoring ensures that dynamic changes in the impulse noise environment are quickly addressed and also ensures better characterization of multiple impulse noise sources in order to provide better impulse noise protection.

27 Claims, 12 Drawing Sheets

OTHER PUBLICATIONS

"ADSL: G.ADSL: Virtual Noise is required for ADSL2plus", Source: BT, Document No: RJ-043, Contribution to ITU-T, Red Bank, New Jersey, Oct. 8-12, 2007.

"ADSL: Erasure Decoding for ADSL", Source: Conexant Systems, Inc, Document No: BF-094, Contribution to ITU-T, Bordeaux, France, Dec. 3-7, 2007.

US Statutory Invention Registration H1726, May 5, 1998, Chen.

Varshney et al, "Radar Signal detection and estimation using time-frequency distributions", Syracuse University, NY, Oct. 1995.

Der-Jenq Liu et al, "Fundamental frequency Estimation Based on the Joint Time-Frequency analysis of harmonic Spectral Structure", IEEE Transactions of Speech and Audio processing, vol. 9, No. 6, Sep. 2001.

Papandreou A. et al, "Detection and estimation of generalized chirps using time-frequency representations", Signals, Systems and Computers, 1994 Conference Record of the Twenty-Eighth Asilomar Conference on vol. 1, Issue , 31 Oct. 2, Nov. 1994 pp. 50-54 vol. 1.

* cited by examiner

SYSTEMS AND METHODS FOR MONITORING IMPULSE NOISE

TECHNICAL FIELD

Although not limited to these applications, the present disclosure generally relates to point-to-point wire line communications and more particularly to impulse noise monitoring in digital subscriber line (DSL) communication systems.

BACKGROUND

The presence of impulse noise can occur in digital subscriber line (xDSL) systems due to electromagnetic interference from such sources as a telephone network, power system, and even from natural phenomena such as thunderstorms and lightning. The presence of impulse noise can significantly limit the reliability of real-time services such as video that can be supported by current generation xDSL systems, for example, VDSL (Very High Speed DSL). In particular, impulse noise can cause physical layer CRC errors and loss of packets in xDSL systems, thereby affecting such triple-play services as IPTV. As the demand for these services increases and as telephone companies realize the added value in efficiently utilizing their local loops, robust designs for impulse noise monitors to collect and analyze the impulse noise statistics for better characterization of impulse noise are required.

SUMMARY

Briefly described, one embodiment, among others, is a system comprising an impulse noise detector for detecting the presence of impulse noise and a time domain analysis module configured to receive the detected impulse noise and perform analysis in the time domain to indicate whether one or more impulse noise sources are present. The time domain analysis module ensures that dynamic changes in the impulse noise environment are addressed in a timely manner. Further, the time domain analysis also provides useful information such as the maximum impulse length and the minimum interarrival time. In some embodiments, the system further comprises a frequency domain analysis module configured to perform analysis in the frequency domain to determine frequencies associated with the one or more impulse noise sources and estimates the actual number of impulse noise sources. The frequency domain analysis module performs long-term analysis in order to provide better characterization of multiple impulse noise sources.

In accordance with some embodiments, the system also includes an intelligence module configured to receive information from the time domain analysis module and the frequency domain analysis module to determine the number of impulse noise sources and frequencies of the impulse noise sources. Other embodiments include a protection module for avoiding bit errors upon detection of impulse noise. The embodiments described herein thus provide dual-speed monitoring of impulse noise in the form of short-term and long-term monitoring. The use of dual-speed monitoring ensures that dynamic changes in the impulse noise environment are quickly addressed and also ensures better characterization of multiple impulse noise sources in order to provide better impulse noise protection.

Another embodiment is a method, which comprises detecting whether impulse noise is present and in response to detecting the presence of impulse noise, performing time domain analysis to determine whether one or more impulse noise sources are present. The time domain analysis provides the maximum impulse length and the minimum interarrival time. The method further includes performing frequency domain analysis to estimate frequencies associated with the one or more impulse noise sources and based on the time domain analysis and frequency domain analysis, providing a total number of impulse noise sources and frequencies associated with the impulse noise sources.

Yet another embodiment is a method, which comprises detecting whether impulse noise is present and generating an impulse noise pattern, receiving the impulse noise pattern, and performing time domain analysis to determine whether one or more impulse noise sources are present. The time domain analysis provides the maximum impulse length and the minimum interarrival time. The method further includes performing frequency domain analysis to estimate frequencies associated with the one or more impulse noise sources and combining the time domain analysis and frequency domain analysis to provide a total number of impulse noise sources and frequencies associated with the impulse noise sources.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
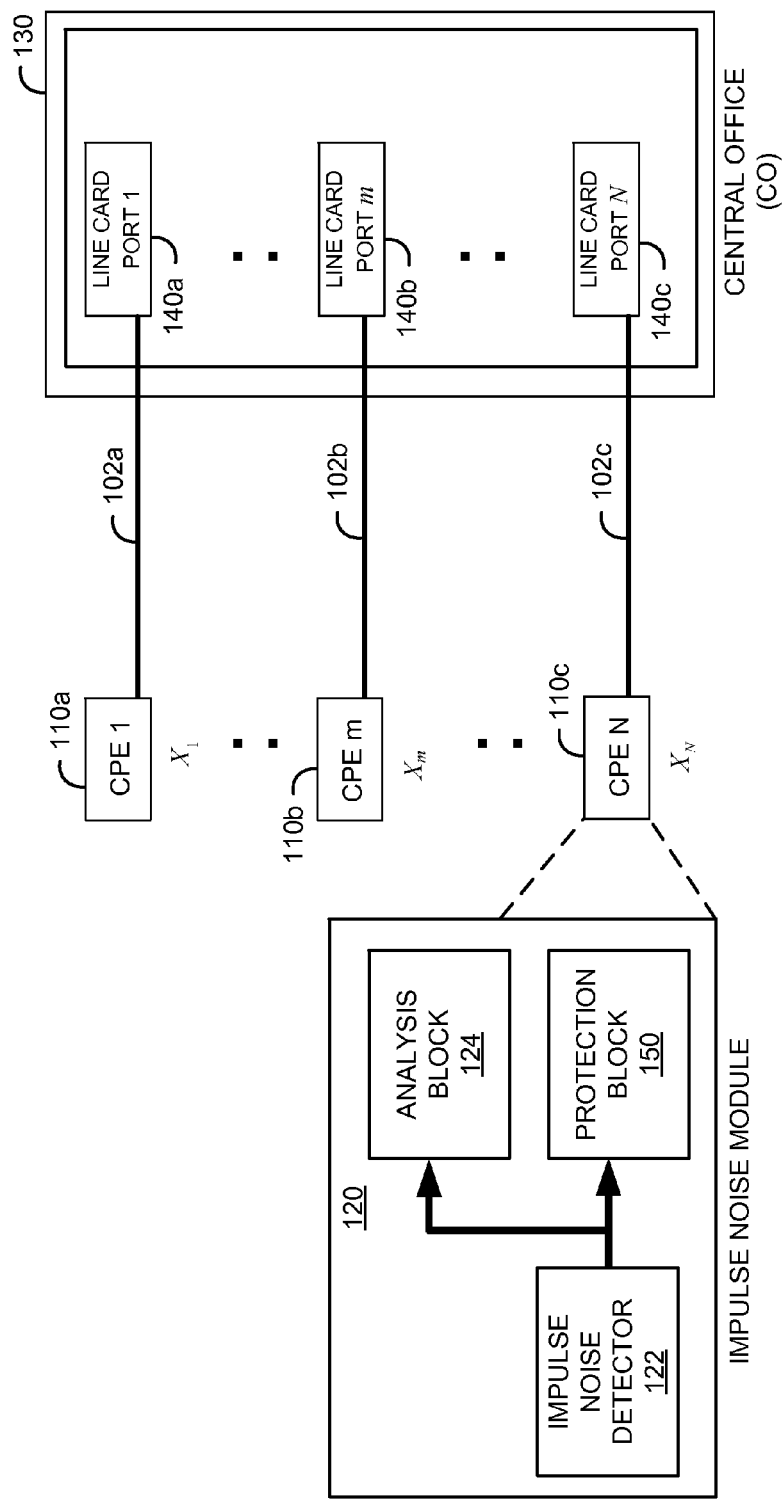
FIG. 1 is a block diagram of an xDSL system in which embodiments for monitoring impulse noise are applied.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments described herein address the effects of impulse noise, and particularly, repetitive electrical impulse noise (or REIN) by performing both short-term (i.e., time domain) and long-term (i.e., joint time-frequency) impulse noise monitoring and analysis. The use of both short-term and long-term monitoring ensures that dynamic changes in the impulse noise environment are quickly addressed and also ensures better characterization of multiple impulse noise sources in order to provide better impulse noise protection. In this regard, the embodiments described herein provide "dual-speed" monitoring of impulse noise in the form of short-term and long-term monitoring. The short-term analysis provides useful information such as the maximum impulse length, the minimum interarrival time occurring on the line, and an indication of whether one or more REIN sources are present. The long-term analysis provides the exact number of REIN sources along with their respective frequencies. Various embodiments also include calculation of parameters for impulse noise protection in order to achieve more robust operation of xDSL systems in the presence of impulse noise. The central office (CO) can then utilize such information to tune INP (impulse noise protection) parameters and modify the virtual noise specification.

Reference is now made to FIG. 1, which illustrates an xDSL system in which embodiments for monitoring impulse noise are applied. In the non-limiting example shown in FIG. 1, N end users (or N sets of CPE 110a, 110b, 110c) are depicted where each user 110a, 110b, 110c is referenced using an index m. The end users 110a, 110b, 110c are connected via a loop 102a, 102b, 102c to a central office (CO) 130. The CO 130 may include an xDSL access multiplexer (DSLAM), xDSL line cards 140a, 140b, 140c, and other equipment for interfacing with end users 110a, 110b, 110c.

In accordance with some embodiments, a REIN module 120 for monitoring and characterizing impulse noise may be incorporated into the end users/customer premises equipment (CPE) 110a, 110b, 110c. While embodiments for impulse noise monitoring are described here in the context of CPE 110a, 110b, 110c, the principles discussed herein may also be incorporated into the CO 130 as well.

Figure 2A:
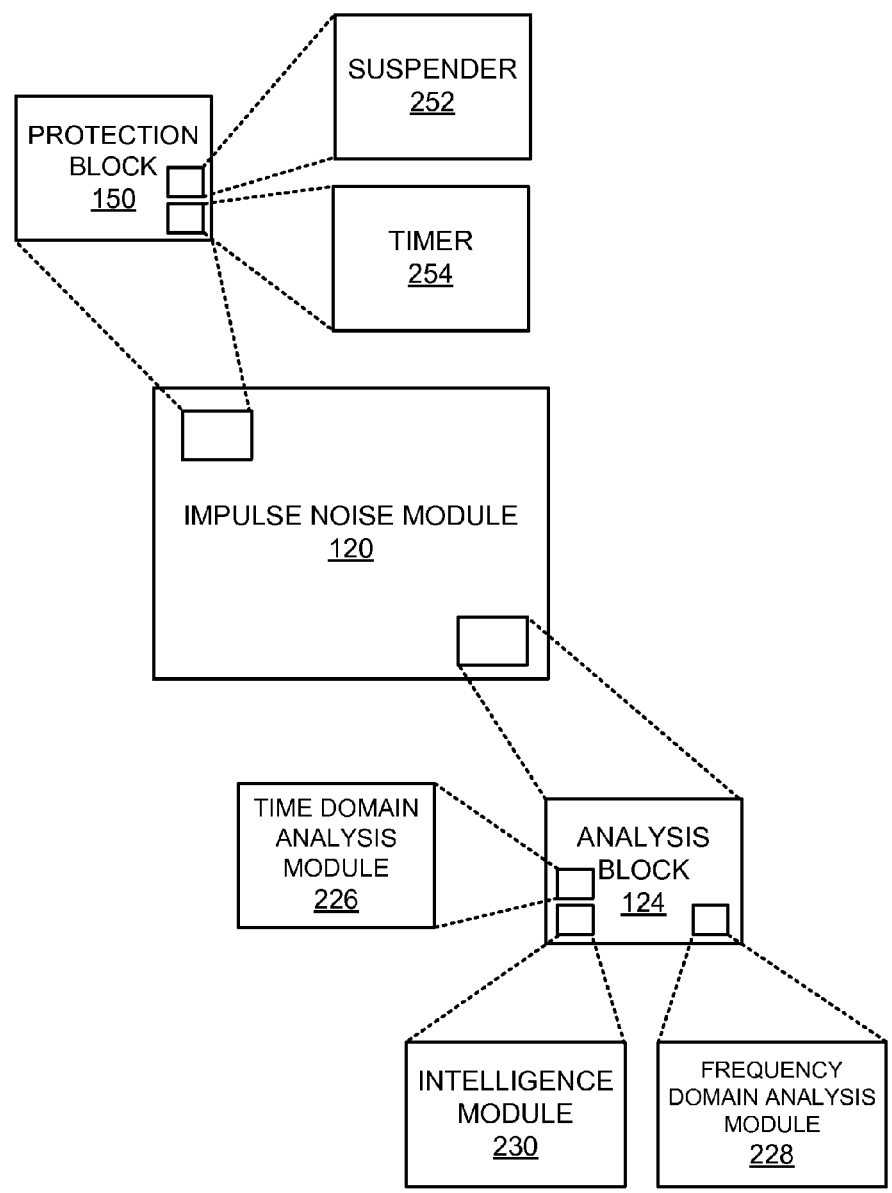
FIG. 2A is a block diagram of various components for the impulse noise module and protection block depicted in FIG. 1.

As depicted in FIG. 1, the impulse noise module 120 may comprise an impulse noise detector 122, an analysis block 124, and a protection block 150. The impulse noise detector 122 detects the presence of impulse noise, and the analysis block 124 monitors and characterizes any detected impulse noise on the line 102a, 102b, 102c. The protection block 150 provides a mechanism for avoiding bit errors during the occurrence of impulse noise. FIG. 2 depicts various components for the impulse noise module and protection block depicted in FIG. 1. In accordance with exemplary embodiments, the analysis block 124 of the impulse noise module 120 may further comprise a time domain analysis module 226, a frequency domain analysis module 228, and an intelligence module 230 for performing joint time-frequency domain analysis.

The time domain analysis module 226 performs "short-term" or time domain analysis in order to determine: 1) whether multiple REIN sources exist on a particular line between the customer premises equipment (CPE) and the central office (CO); 2) an estimation of the lowest interarrival time and the highest impulse length; and 3) an estimation of the REIN source for instances where only a single source exists on the line. By quickly providing these measurements via time domain analysis, the dynamic nature of the system can be better tracked and impulse noise events addressed. Accordingly, such information relating to the impulse noise can be used in real time to provide an effective way for adjusting impulse noise protection.

The frequency domain analysis module 228 performs long-term analysis in order to determine the sources of REIN (repetitive electrical impulse noise). In particular, the frequency analysis module 228 performs smart processing by using multi-observation windows to target different ranges of REIN sources. Further, sub-band analysis is utilized to perform a consistency check of all potential REIN sources in the frequency domain. Exemplary embodiments thus achieve both a high probability of detection and a low probability of false alarms. Information derived from the time domain analysis module 226 and the frequency domain analysis module 228 is then jointly processed by the intelligence module 230 to provide a final determination of the number of REIN sources and the corresponding frequencies of these identified REIN sources.

The protection block 150 may include a suspender block 252 and a timer block 254. As will be described later in this disclosure, the suspender block 252 suspends or halts updates to a frequency domain equalizer (FEQ) in addition to bit swapping and seamless rate adaptation (SRA) functions. The timer block 254 is used to determine how long to suspend these operations before resuming operation. Further details regarding the functionality of the suspender block 252 are discussed later in this disclosure.

Figure 2B:
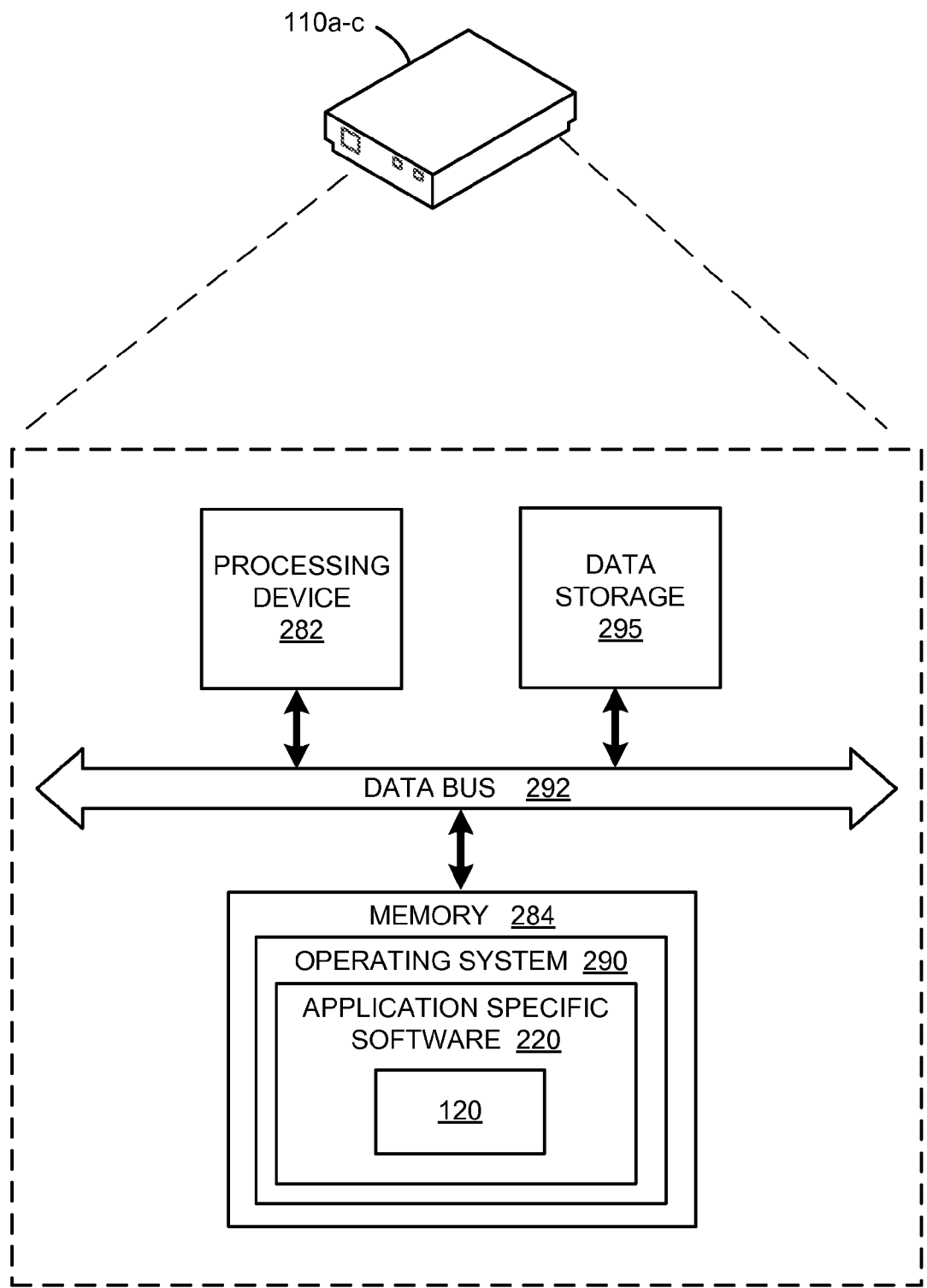
FIG. 2B is a block diagram of an embodiment of one of the end users depicted in FIG. 1.

Reference is now made to FIG. 2B, which is a block diagram of an embodiment of one of the end users depicted in FIG. 1. In accordance with certain embodiments, the steps for performing detection and monitoring of impulse noise sources described in this disclosure may be incorporated in software within an end user such as a DSL modem. One of ordinary skill in the art will appreciate that DSL modems comprise other components, which have been omitted for purposes of brevity. Generally, the DSL modem 110a-c may include a processor 282, a memory component 284 (which may include volatile and/or nonvolatile memory components), and a data storage component 295 that are communicatively coupled via a local interface 292.

The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a device for executing software, particularly software stored in the memory component 284. The processor 282 can be any custom made or commercially available processor, a central processing unit (CPU), an auxiliary processor among several processors associated with the DSL modem 110a-c, a semiconductor based microprocessor (in the form of a microchip or chip set), a macroprocessor, or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 284 may incorporate electronic, magnetic, optical, and/or other types of storage media. One should note that some embodiments of the memory component 284 can have a distributed architecture (where various components are situated remotely from one another), but can be accessed by the processor 282.

The software in memory component 284 may include one or more separate programs, each of which includes an ordered listing of executable instructions for implementing logical functions. In the example shown in FIG. 2B, the software in the memory component 284 may include an operating system 290. Furthermore, the software residing in memory 284 may include application specific software 220, which may further comprise the impulse noise module 120 depicted in FIGS. 1 and 2. It should be noted, however, that these modules can be implemented in software, hardware or a combination of software and hardware. The operating system 290 may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 290. When the DSL modem 110*a-c* is in operation, the processor 282 may be configured to execute software stored within the memory component 284, communicate data to and from the memory component 284, and generally control operations of the DSL modem 110*a-c* pursuant to the software. Software in memory may be read by the processor 282, buffered within the processor 282, and then executed.

Figure 3:
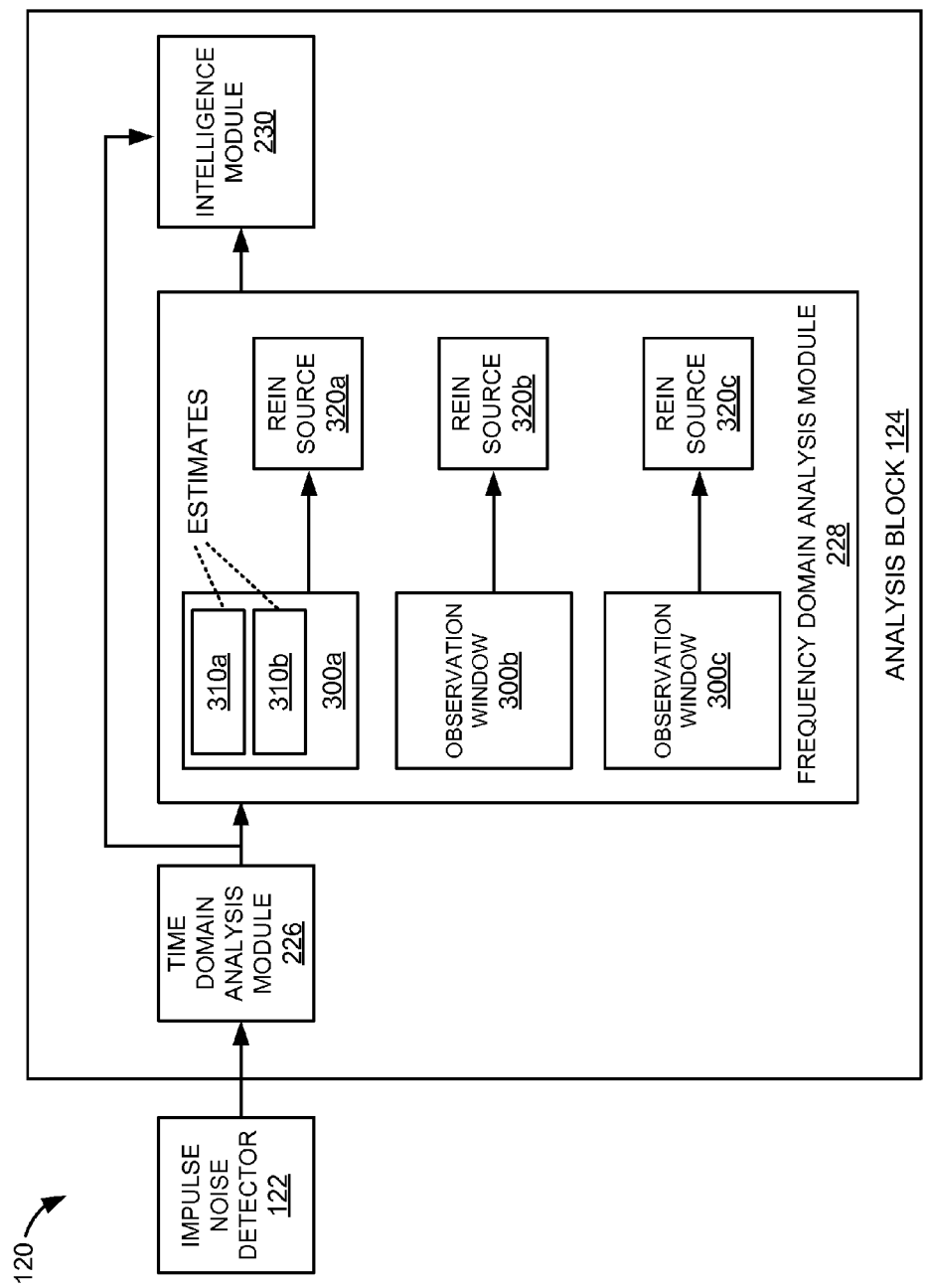
FIG. 3 illustrates signal flow for the modules depicted in FIGS. 1 and 2.

Reference is made to FIG. 3, which illustrates signal flow for the modules depicted in FIGS. 1 and 2. Upon detecting the presence of impulse noise, the impulse noise detector 122 forwards the impulse noise pattern to the time domain analysis module 226 where estimations such as the maximum impulse length and minimum interarrival time are performed. Further, the time domain analysis module 226 determines whether one or more impulse noise sources exist. The time domain analysis module 226 forwards this information to both the frequency domain analysis module 228 and the intelligence module 230.

The frequency domain analysis module 228 estimates both the number of impulse noise sources and their respective frequencies using multiple observation windows 300*a-c*. The intelligence module 230 uses the results obtained from the time domain analysis module to select the subset of REIN sources estimated by the frequency domain analysis module 228. As discussed above, the time domain analysis module 226 indicates whether multiple REIN sources exist on the line and also estimates the maximum impulse length and minimum interarrival time.

The frequency domain analysis module 228 combines estimations 310*a*, 310*b* from the various observation windows 300*a*, 300*b*, 300*c* with information relating to the number of REIN sources from the time domain analysis module 226 and makes its own determination regarding the number of REIN sources. The identified REIN sources 320*a-c*, along with other information are forwarded to the intelligence module 230, which performs joint time-frequency analysis to ultimately determine the number of REIN sources present on the line and their respective frequencies. This is accomplished by processing the results from the observation windows 300*a*, 300*b*, 300*c* and other parameters (e.g., indication of multiple REIN sources and the lower bound of the interarrival time determined by the time domain analysis module 226).

Generally, time domain analysis involves computation of standard parameters as defined in "ITU-T Recommendation G.993.2 Very High Speed Digital Subscriber Line Transceivers 2 (VDSL2); 2007". However, embodiments described herein for monitoring impulse noise are performed using both standard and "non-standard" parameters. Non-standard parameters simply refer to parameters outside of those defined in ITU-T Recommendation G.993.2. Standard impulse noise monitor (INM) parameters as defined in G.993.2 include INCL (the cluster length from the first symbol to the last symbol), INCD (the number of degraded symbols within the cluster), INCG (the number of gaps in the cluster), and INP_EQ (equivalent impulse noise protection).

Primitives include INMAINPEQ and INMAIATO. ITU-T Recommendation G.993.2 defines primitives as basic measures of performance that are usually obtained from digital signal line codes and frame formats, or as reported in overhead indicators from the far end. Performance primitives are categorized as events, anomalies and defects. Primitives may also be basic measures of other quantities (e.g., AC or battery power) and are usually obtained from equipment indicators. Standard INM parameters and primitives are generated from the set configuration of INMCC, INMIATO, INMIATS, and INM_INPEQ_MODE, which can be vendor specific. Non-standard buffers and histograms (identified by the "NS" prefix) include NS_IATB (non-standard interarrival time buffer) and NS_INPEQB (impulse noise protection buffer). These non-standard buffers are generated for every block of DMT symbols. It should be noted that while various embodiments described herein utilize histograms, other statistical data may also be utilized.

Non-standard histograms NS_IATH and NS_INPEQH are generated from NS_IATB and NS_INPEQB. These non-standard histograms are utilized because standard INM primitives such as those described above depend on the configuration of INMCC, INMIATO, INMIATS, and INP_INPEQ_MODE, which are dynamic in nature. Given the dynamic nature of standard parameters/primitives, REIN source estimates can be affected. In particular, it should be noted that all parameters, including the maximum impulse length and minimum interarrival time, will be affected. As such, non-standard parameters that are based on the number of REIN sources, the frequencies of REIN sources, and the impulse length of the REIN sources are monitored to provide a more reliable estimate of the number of REIN sources.

Figure 4:
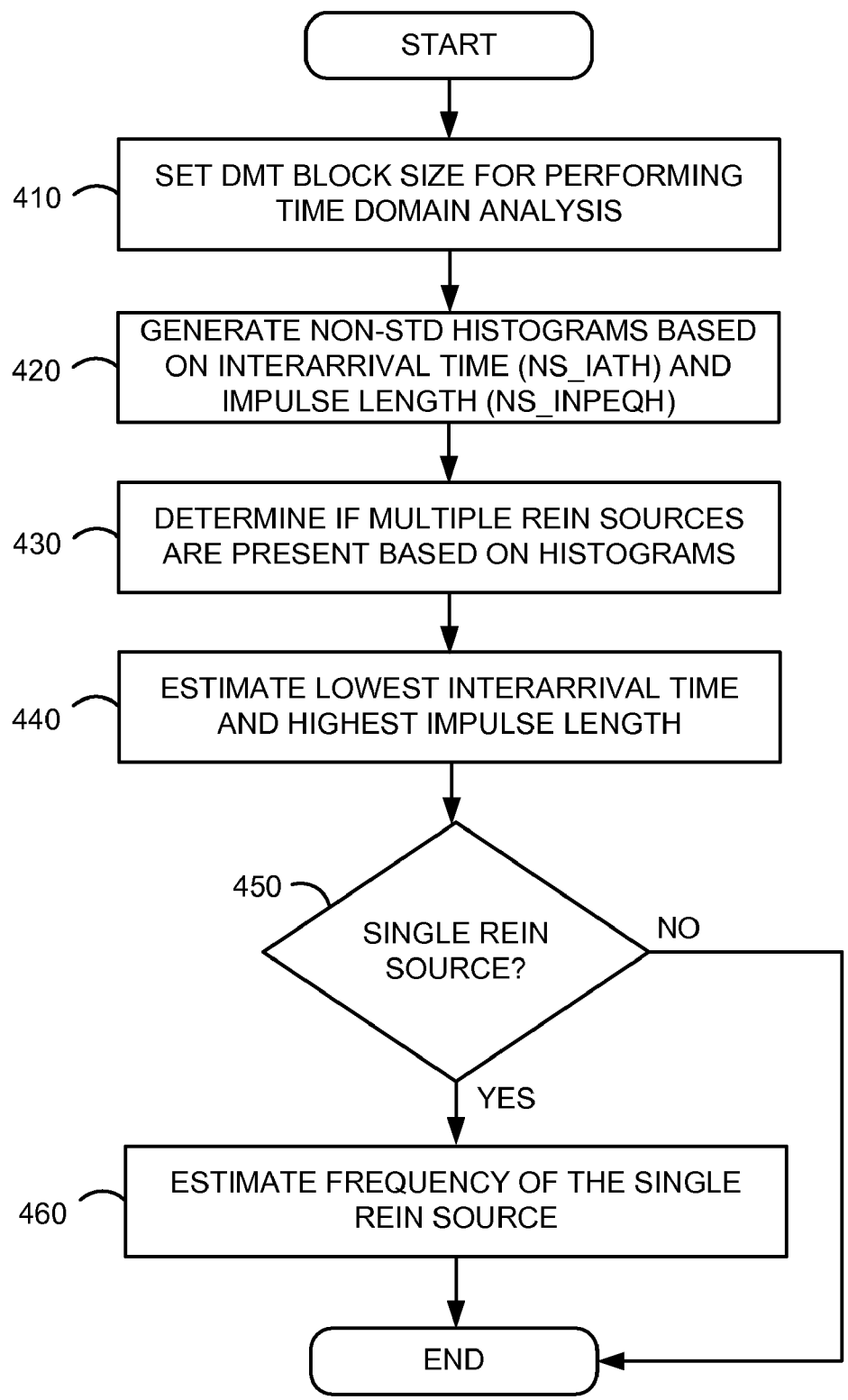
FIG. 4 is a flowchart for one embodiment of time domain analysis utilizing the time domain analysis module depicted in FIGS. 2-3.

Reference is made to FIG. 4, which is a flowchart for one embodiment of time domain analysis utilizing the time domain analysis module depicted in FIGS. 2-3. Beginning in step 410, the DMT block size for performing time domain analysis is selected. As a non-limiting example, the DMT block size for time domain analysis may be set to 512. In step 420, the non-standard histograms described above are generated based on interarrival time non-standard histogram (NS_IATH) and the histogram NS_INPEQH. Based on these histograms, a determination is made on whether there are multiple REIN sources present. This is accomplished by computing the standard deviation of the bins with non-zero hits in the interarrival time histogram (NS_IATH). This is generally a high-complexity embodiment for performing the time domain analysis.

If the standard deviation is greater than a predetermined threshold, then a determination is made that multiple REIN sources exist on the line. In low-complexity embodiments for performing time domain analysis, this determination is based on the sum of the absolute difference about the mean (or center of gravity) of all non-zero hit bins evaluated above a set threshold. The mean can be calculated in two ways: 1) by the absolute mean of non-zero hit bins; or 2) by computing the center of gravity of the interarrival histogram.

In step 440, an estimate is made on the lower bound of the interarrival time and the highest impulse length. This is determined by computing the bin number which has the maximum number of hits in NS_IATH along with the maximum bin number with non-zero hits in NS_IATH. The lower bound of the interarrival time (IAT) is then determined based on these two parameters (bin number which has the maximum number of hits; maximum bin number) in the range of REIN sources to be monitored. Regarding the highest impulse length, this is estimated based on the histogram NS_INPEQH. The highest impulse length is determined by examining the maximum bin number with non-zero hits.

In decision block 450, a determination is made on whether there is a single REIN source present or multiple REIN sources present (refer back to step 430). If a single REIN source is present, then in step 460, the frequency of the single REIN source is estimated by performing short-term time domain analysis based on the outcome from step 430 (i.e., whether multiple REIN sources are present). In particular, the estimate is based on the bin number which has the maximum number of hits in the NS_IATH histogram. The parameters discussed in relation to FIG. 4 are used to quickly adjust impulse noise protection. The response time is based on the block size. For a 512 DMT block size, the response time is on the order of 128 ms, for example. If a single REIN source is determined, a precise estimate of the REIN source interarrival time can be estimated.

Figure 5A:
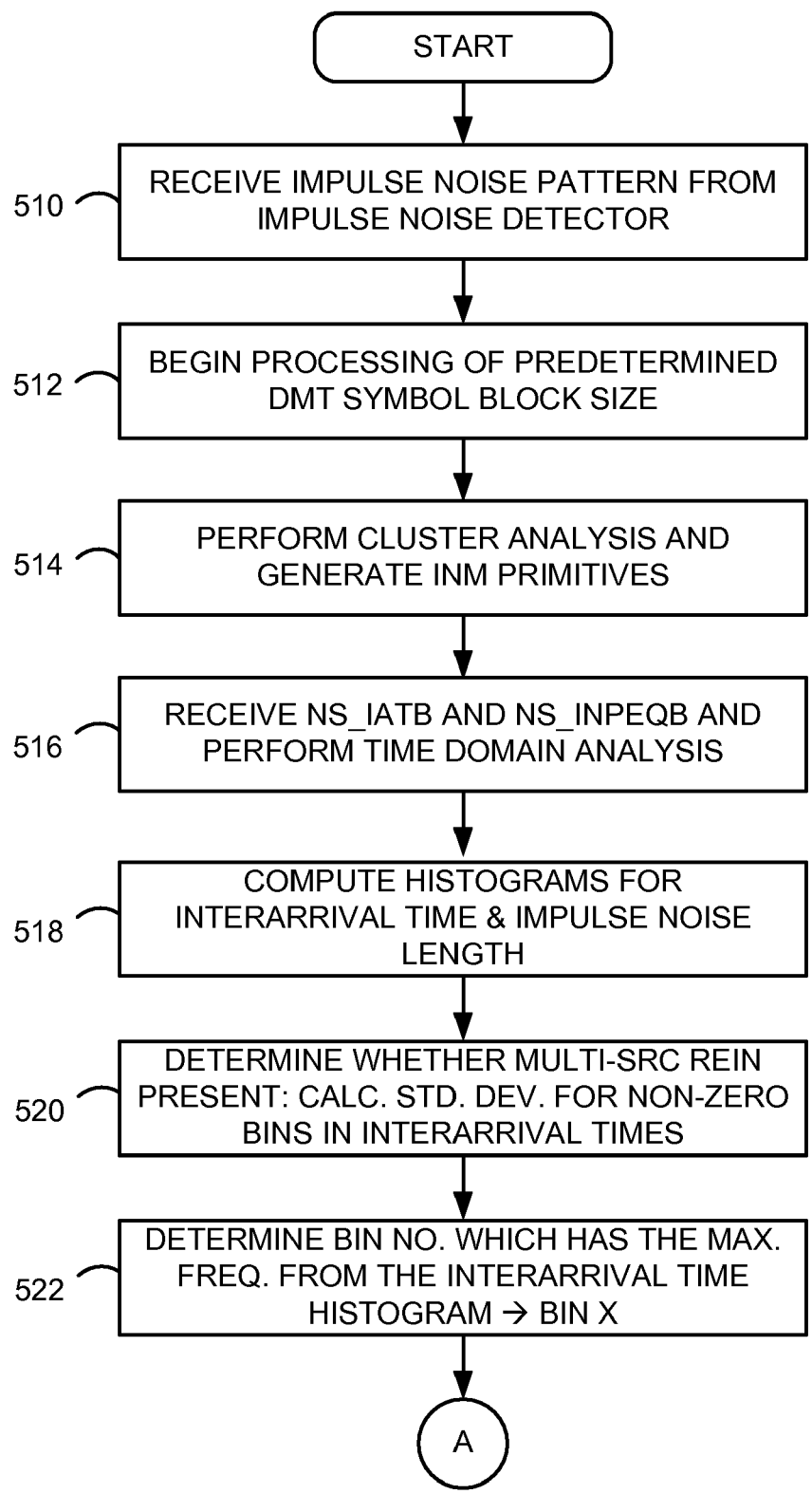
FIGS. 5A-5B provide a flowchart for an embodiment of time domain analysis utilizing the time domain analysis module depicted in FIGS. 2-3 and the process depicted in FIG. 4.
Figure 5B:
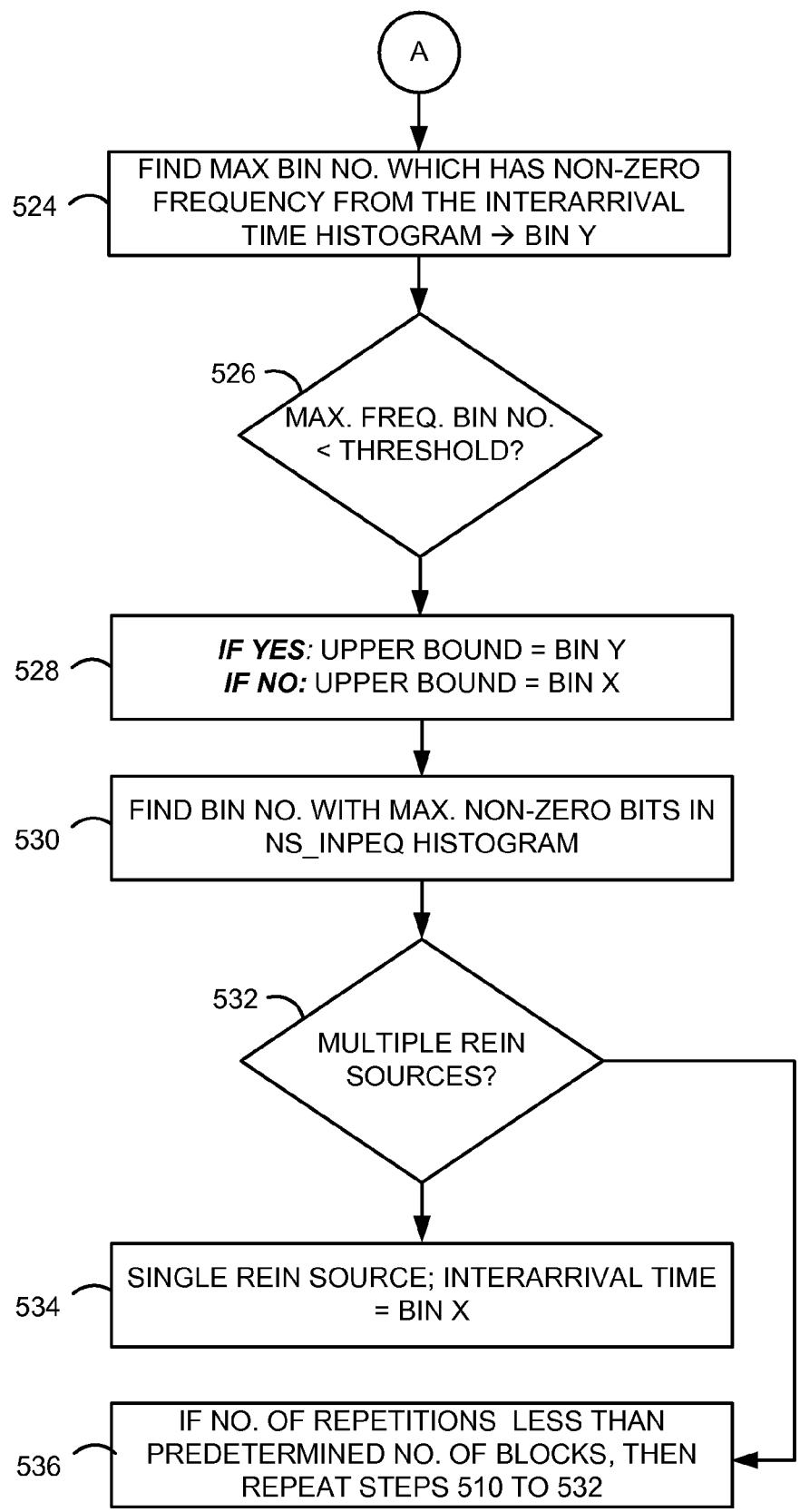

FIGS. 5A-5B provide a flowchart for an embodiment of time domain analysis utilizing the time domain analysis module depicted in FIGS. 2-3 and the process depicted in FIG. 4. In step 510, the impulse noise pattern is received from the impulse noise detector. Processing then begins on a predetermined block size (step 512). As a non-limiting example, the block size may be 512 symbols. In step 514, cluster analysis is performed on standard G.993.2 parameters (INCL, INCD, INCG, INP_EQ), and primitives ($INMAINPEQ_{1-17}$, $INMAIATO_{0-7}$) are computed.

In step 516, non-standard buffers NS_IATB and NS_IN-PEQB are received and time domain analysis is performed. From these parameters, histograms are generated (NS_IATH, NS_INPEQH) (step 518). Based on the standard deviation for bins with non-zero hits in the NS_IATH histogram, a determination is made on whether multiple REIN sources are present (step 520). In particular, if the standard deviation is greater than a pre-determined threshold, than a determination is made that multiple REIN sources are present. If the standard deviation is less than or equal to the pre-determined threshold, then a determination is made that a single REIN source is present. As described above, in low-complexity embodiments, this determination is based on the sum of the absolute difference about the mean (or center of gravity) of all non-zero hit bins evaluated above a set threshold. The mean can be calculated in two ways: 1) by the absolute mean of non-zero hit bins; or 2) by computing the center of gravity of the interarrival histogram In step 522, the bin number which has the maximum frequency in the NS_IATH histogram is identified. For purposes of later referring to this bin, this bin can be designated as "BIN X". With reference to FIG. 5B, the maximum bin number from all bins within the NS_IATH histogram which have non-zero hits is identified ("BIN Y") (step 524). If BIN X is less than a predetermined threshold, then the upper bound of the maximum frequency is determined to be BIN Y, otherwise, the upper bound is determined to be BIN X (decision block 526, step 528).

In step 530, the upper bound of the highest impulse length is determined. This involves identifying the bin number with maximum non-zero hits in the NS_INPEQH histogram. In decision block 532, if multiple REIN sources are determined to be present (based on the time domain analysis), then repeat steps 510 to 532 for a predetermined number of blocks (step 536). Referring back to decision block 532, if there is only a single REIN source present, then in step 534, the interarrival time for the REIN source is determined to be equal to BIN X.

Figure 6:
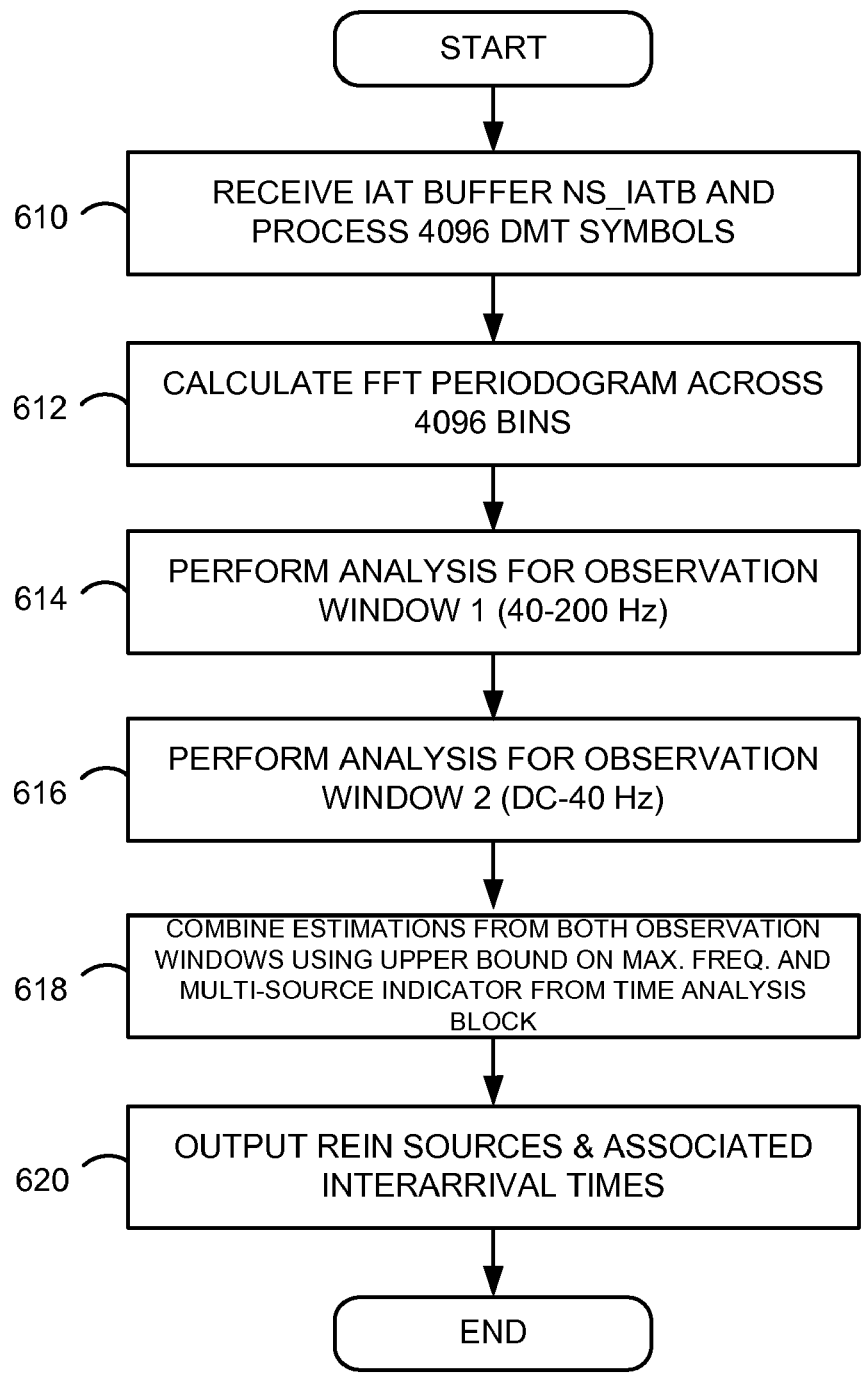
FIG. 6 is a flowchart of an embodiment for performing frequency domain analysis utilizing the frequency domain analysis module depicted in FIGS. 2-3.

Reference is now made to FIG. 6, which is a flowchart of an embodiment for performing frequency domain analysis utilizing the frequency domain analysis module depicted in FIGS. 2-3. In step 610, the interarrival time buffer NS_IATB generated in the time domain analysis stage is received and processing begins for a predetermined number of symbols. As a non-limiting example, for this "long-term" processing, the number of symbols can be set to 4096, for example. In step 612, an FFT periodogram is calculated across the 4096 bins, and candidate peaks (or harmonics of REIN frequencies) are extracted from the periodogram based on a predetermined threshold.

In general, some of the most common sources of repetitive impulse noise field include home appliances, motors, and electrical switches. These sources therefore typically exhibit some harmonic of fundamental power-line frequencies (i.e., 50 Hz and 60 Hz). For robust detection and estimation of REIN sources, frequencies below 40 Hz are treated differently (i.e., peak threshold detection) than those frequencies above 40 Hz with regards to extraction of relevant spectral peaks. Thus, to perform detection and estimation of all potential REIN sources, the entire band may be divided into two observation windows ranging from dc to 40 Hz (observation window 1) and 40 Hz and above (observation window 2). It should be noted, however, that embodiments are not limited to two observation windows. The steps described below can be extended to any number of observation windows, depending upon the range of frequencies under consideration.

In steps 614-616, analysis is performed across multiple observation windows defined according to frequency. In step 618, the estimation generated from these observation windows are combined based on the upper bound on the maximum frequency and based on the determination of whether multiple REIN sources are present (performed in the time domain analysis stage). In step 620, the number of REIN sources and associated interarrival times are output.

Figure 7A:
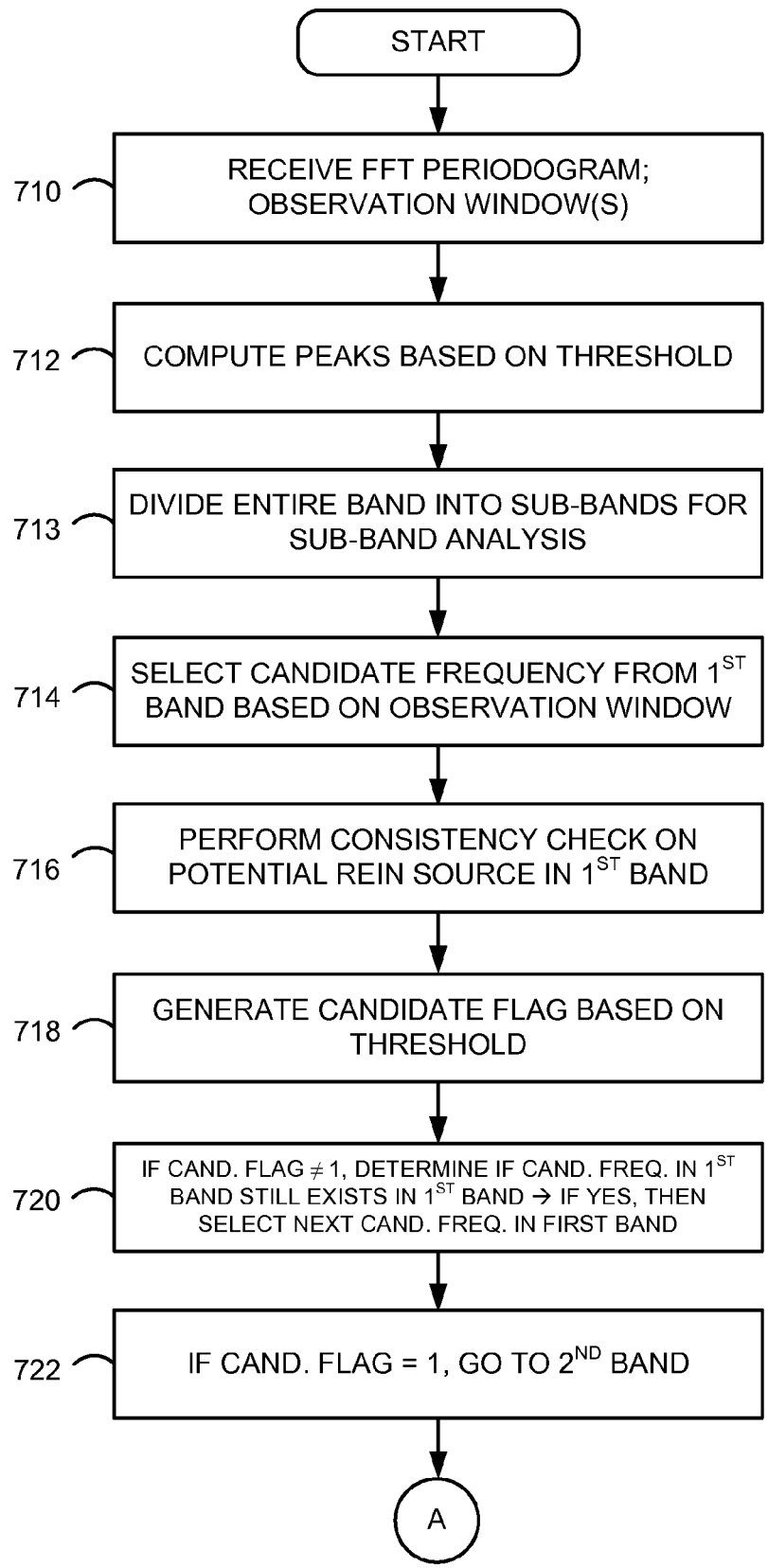
FIGS. 7A-7B is a flowchart for an embodiment of frequency domain analysis utilizing the frequency domain analysis module depicted in FIGS. 2-3 and the process depicted in FIG. 6.
Figure 7B:
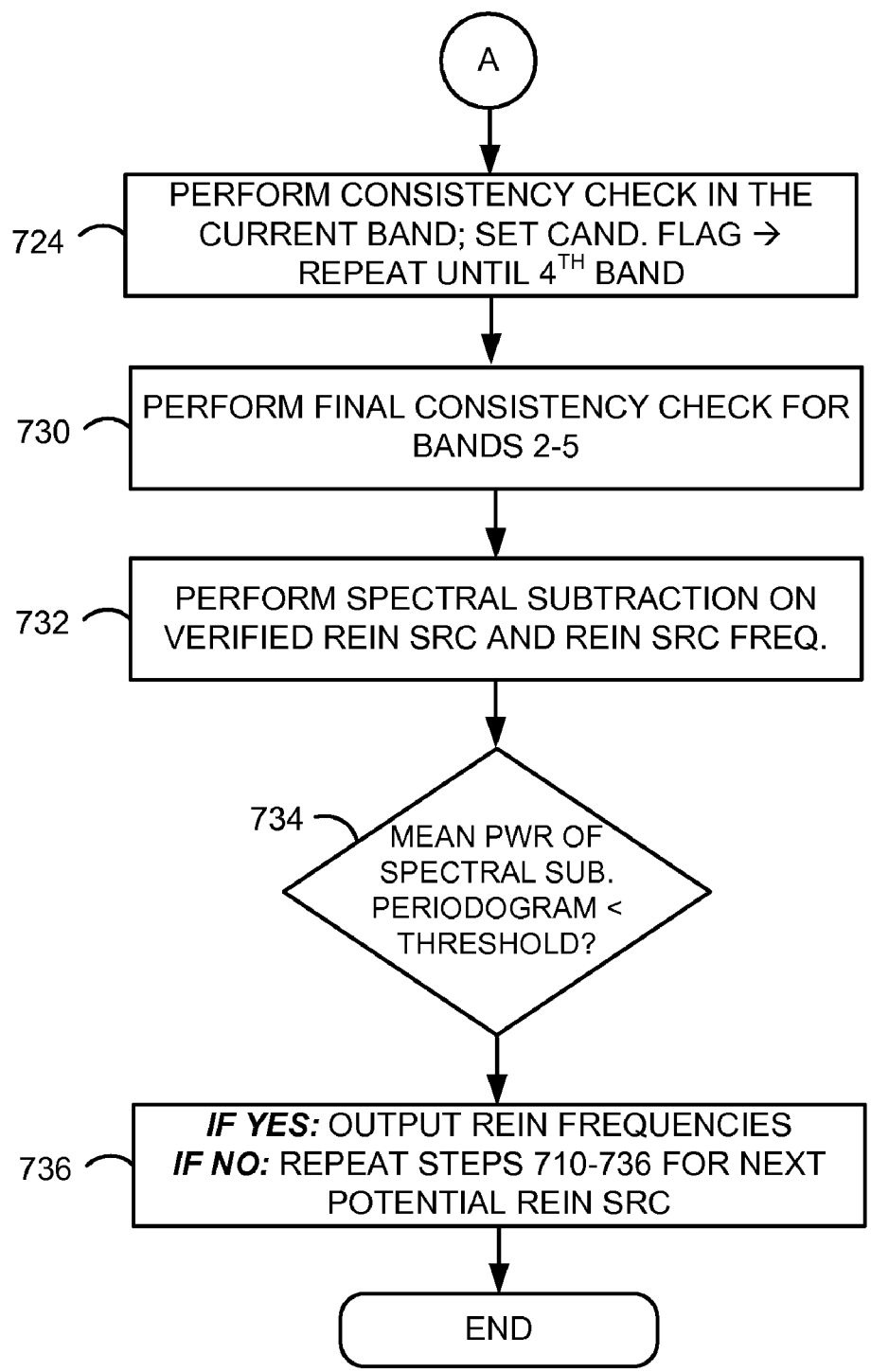

Reference is now made to FIGS. 7A-7B, which depict a flowchart for an embodiment of frequency domain analysis utilizing the frequency domain analysis module depicted in FIGS. 2-3 and the process depicted in FIG. 6. It should be noted in general, the frequency domain analysis is based on the interarrival time event buffer NS_IATB described earlier. This event buffer stores the difference of consecutive impulse events in terms of a DMT symbol unit and is computed over a predetermined number of bins. An indicator function is generated using the interarrival time buffer time stamp.

The frequency analysis involving the indicator function may be performed using either non-parametric (window-based) or parametric (with signal modeling) spectral estimation. Beginning in step 710, FFT periodogram computed over the predetermined number of bins is received (a non-parametric approach). For some embodiments, the predetermined number of bins is 4096. Furthermore, observation windows are also received. In step 712, the peaks associated with potential REIN sources are computed based on a threshold.

For some embodiments, the threshold α may be set to 11.5 for the second observation window and 9.5 for the first observation window.

The targeted REIN sources frequencies can be retrieved using the harmonic check, but due to phase offsets between the multiple REIN sources, the FFT periodogram may have constructive and destructive harmonics. To address this, a multi-level threshold process is used in order to perform a robust consistency check based on harmonics. The process is conducted separately in the various observation windows.

In accordance with some embodiments, the multi-level threshold concept may be based on sub-band analysis where the entire band is divided into five sub-bands (step 713). The steps described below can be extended to any number of sub-bands. As a non-limiting example, these sub-bands may each have a bandwidth of 400 Hz. The first band is generally the main band in which candidate REIN sources are identified. Referring to back to FIG. 7A, a candidate frequency is selected from the first band based on the observation window (step 714). In step 716, a consistency check is performed on the candidate frequency in the first band. A candidate flag is then generated based on a threshold (step 718). For some embodiments, the threshold may be calculated with respect to a value $\beta$ for the main band (e.g., the first band) where threshold=$\beta \times$(total number of harmonics present in the first band of the potential REIN source).

If the candidate flag is not equal to 1, then a check is performed to see if the candidate frequency still exists in the first band (step 720). A consistency check is performed in the current band for the potential REIN source. If there is a candidate frequency (i.e., the candidate flag is equal to 1), then a consistency check across the remaining bands (step 722). Referring to step 724 in FIG. 7B, a candidate flag is set, and the consistency check is repeated for bands 2-4. The remaining bands may be used to evaluate the overall performance of the candidate REIN sources using two levels of consistency checks (step 730). The first consistency check involves a band consistency check threshold $\gamma$, which is generally a less stringent threshold than $\beta$. The second consistency check utilizes a majority rule using flags generated by the first consistency check across the remaining bands. For some embodiments, the values for $\beta$ and $\gamma$ may be set to 0.75 and 0.5, respectively.

The process of detection and estimation of REIN sources is performed by selecting candidate REIN sources from the main band and verifying the estimation (in-band) using the consistency threshold of the main band. This verification process is evaluated across the remaining bands using the in-band consistency check and the majority rule adopted. Once a particular REIN source is verified via a consistency check across all the bands, spectral subtraction is applied to uncover the next potential REIN source (step 732). These steps are performed in a recursive fashion until the mean power of the spectral subtracted periodogram falls below a predetermined level (decision block 734). If the mean power of the spectral subtracted periodogram is less than the predetermined level, then the identified REIN sources are output. The frequency domain analysis module also estimates the number of REIN sources present on the line. If the mean power of the spectral subtracted periodogram is not less than the predetermined level, the steps above are repeated for the next potential REIN source (step 736).

Figure 8:
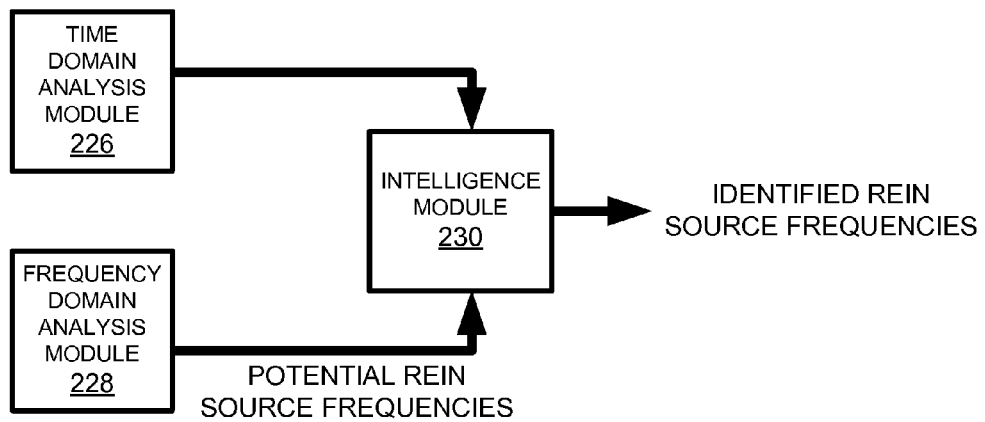
FIG. 8 is a flow diagram between the intelligence module, the time domain analysis module, and the frequency domain analysis module depicted in FIGS. 1 and 2.

FIG. 8 illustrates a flow diagram involving the intelligence module, the time domain analysis module, and the frequency domain analysis module depicted in FIGS. 1 and 2. The final estimate of the REIN sources frequencies is obtained by combining the results from the observation windows and parameters (e.g., multi-source flag, lower bound of the interarrival time) obtained from the time domain analysis module 226. As discussed earlier, the time domain analysis module 226 performs "short-term" or time domain analysis in order to determine: 1) whether multiple REIN sources exist on a particular line between the customer premises equipment (CPE) and the central office (CO); 2) an estimation of the lowest interarrival time and the highest impulse length; and 3) an estimation of the REIN source for instances where only a single source exists on the line.

The frequency domain analysis module 228 performs long-term analysis in order to determine the sources of REIN (repetitive electrical impulse noise). Information derived from the time domain analysis module 226 and the frequency domain analysis module 228 is then combined by the intelligence module 230 to determine the number of REIN sources and the corresponding frequencies of the identified REIN sources.

The intelligence engine 230 utilizes the results obtained from the time domain analysis module 226 to select a subset of REIN sources estimated by frequency domain analysis module 228. Parameters provided by the time domain analysis module 226 include an indicator for whether multiple REIN sources exist on the line and an estimate of the lowest interarrival time. In accordance alternative embodiments, the number of REIN sources and the upper bound of the interarrival time can be used to further refine the identification process for REIN sources to provide a final determination.

Figure 9:
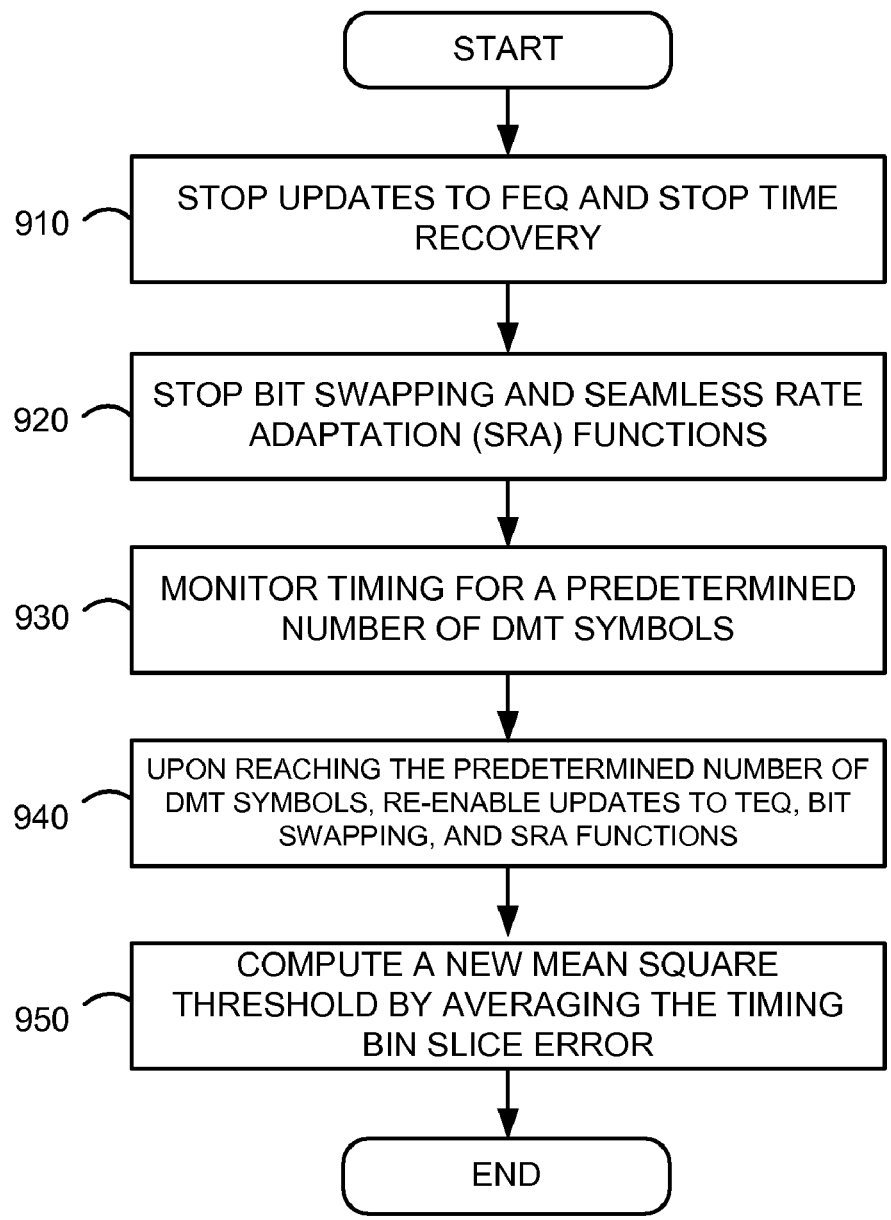
FIG. 9 is a flowchart for one embodiment for avoiding bit errors by utilizing the protection block depicted in FIGS. 1-2.

Reference is made to FIG. 9, which is a flowchart for one embodiment for avoiding bit errors by utilizing the protection block depicted in FIGS. 1-2. For various embodiments of the protection block, a frequency domain equalizer (FEQ) is incorporated. Referring back to FIG. 9, step 910 begins by freezing or halting all updates to the FEQ. The time recovery phase is also halted. In step 920, all bit swapping (BS) and seamless rate adaptation (SRA) functions are also suspended.

In step 930, timing is monitored for a predetermined number of DMT symbols. Each DMT symbol occurs at approximately a rate of 1/4000 seconds. This timing function is performed in order to track the period of time in which the operations discussed above are suspended or halted. The duration of the timer is set to an interval which spans the duration of a typical impulse noise spike with some additional guard time built in. In step 940, upon expiration of the timer, the operations discussed above are re-enabled and performed in their normal operating states. In step 950, a new mean square threshold is computed by averaging the timing bin slice error.

In accordance with some embodiments, the impulse noise analysis described in relation to FIGS. 4-7B and the protection scheme described in relation to FIG. 9 may be performed sequentially or concurrently upon detecting the presence of impulse noise. It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a communication system, comprising:

detecting, by the communication system, whether impulse noise is present;

in response to detecting the presence of impulse noise, performing time domain analysis;

performing frequency domain analysis to estimate frequencies associated with the one or more impulse noise sources;

based on the time domain analysis and frequency domain analysis, providing a total number of impulse noise sources and frequencies associated with the impulse noise sources; and in response to detecting the presence of impulse noise, suspending updates to a subset of: a frequency domain equalizer (FEQ), bit swapping, and seamless rate adaptation (SRA).

2. The method of claim 1, wherein suspending updates is performed for a predetermined period of time.

3. The method of claim 2, further comprising re-enabling updates to the FEQ and re-enabling bit swapping and SRA once the pre-determined period of time has passed, wherein the pre-determined period of time is an estimated impulse noise duration plus a guard time.

4. The method of claim 1, wherein performing time domain analysis further comprises performing at least one of:
generating statistical data based on interarrival time and impulse length;
estimating a lowest interarrival time of one or more impulse noise sources based on the statistical data;
estimating a highest length of the one or more impulse noise sources based on the statistical data; and
indicating whether one or more impulse noise sources are present.

5. The method of claim 1, wherein performing time domain analysis further comprises:
in response to determining that a single impulse noise source exists, estimating a frequency of the single impulse noise source.

6. The method of claim 1, wherein the time domain analysis is performed based on a first predetermined block size and wherein the frequency domain analysis is performed based on a second predetermined block size.

7. The method of claim 6, wherein the first predetermined block size is less than the second predetermined block size.

8. The method of claim 1, wherein performing frequency domain analysis comprises:
defining a range of frequencies in which to search for impulse noise sources;
dividing the range of frequencies into a plurality of observation windows;
calculating an FFT peridogram across all the observation windows;
identifying frequencies of impulse noise sources;
performing a multi-level threshold consistency check for each identified frequency based on the FFT periodogram across all the observation windows, wherein the consistency check is performed to verify each identified frequency of impulse noise sources; and
performing spectral subtraction after the each identified frequency is verified to identify a next impulse noise source.

9. A method implemented in a communication system, comprising:
detecting, by the communication system, whether impulse noise is present and generating an impulse noise pattern;
receiving the impulse noise pattern;
performing time domain analysis to determine whether one or more impulse noise sources are present;
performing frequency domain analysis to estimate frequencies associated with the one or more impulse noise sources;

combining the time domain analysis and frequency domain analysis to provide a total number of impulse noise sources and frequencies associated with the impulse noise sources; and in response to detecting the presence of impulse noise, suspending updates to a subset of: a frequency domain equalizer (FEQ) and suspending bit swapping and seamless rate adaptation (SRA) to avoid bit errors.

10. The method of claim 9, wherein the time domain analysis is performed based on a first predetermined block size, wherein the frequency domain analysis is performed based on a second predetermined block size, and wherein the first predetermined block size is less than the second predetermined block size.

11. A system comprising:
an impulse noise detector for detecting the presence of impulse noise;
a time domain analysis module configured to receive the detected impulse noise and perform analysis in the time domain to indicate whether one or more impulse noise sources are present
a frequency domain analysis module configured to perform analysis in the frequency domain to determine frequencies associated with the one or more impulse noise sources;
an intelligence module configured to receive information from the time domain analysis module and the frequency domain analysis module, wherein the intelligence module is configured to determine the number of impulse noise sources and frequencies of the impulse noise sources; and
a protection module for avoiding bit errors upon detection of impulse noise.

12. The system of claim 11, wherein the time domain analysis module is further configured to determine at least one of:
an estimate of lowest interarrival time among the one or more impulse noise sources;
a highest length of impulse noise among the one or more impulse noise sources; and
an indication of whether one or more impulse noise sources are present.

13. A system of claim 12, wherein upon determining that a single impulse noise source exists, the time domain analysis module is further configured to estimate a frequency of the single impulse noise source.

14. A system of claim 12, wherein the time domain analysis module determines the estimate of lowest interarrival time and the highest length of impulse noise by analyzing statistics relating to interarrival time and statistics relating to impulse length.

15. The system of claim 11, wherein the frequency domain analysis module is configured to determine frequencies using one of:
non-parametric spectral estimation and parametric spectral estimation, wherein the non-parametric spectral estimation is a window-based approach and wherein the parametric spectral estimation is based on signal modeling.

16. The system of claim 11, wherein a number of symbols used by the time domain analysis module is less than a number of symbols used by the frequency domain analysis module.

17. The system of claim 11, wherein the frequency domain analysis module is further configured to:
define a range of frequencies in which to search for impulse noise sources;

divide the range of frequencies into a plurality of observation windows;
calculate an FFT periodogram across the plurality of observation windows;
identify frequencies of impulse noise sources, wherein for each identified frequency;
perform a multi-level threshold consistency check for each identified frequency based on the FFT periodogram across the plurality of observation windows, wherein the consistency check is performed to verify each identified frequency of impulse noise sources; and
perform spectral subtraction after the each identified frequency is verified to identify a next impulse noise source.

18. The system of claim 17, wherein the frequency domain analysis module is further configured to perform spectral subtraction and process a next identified frequency, wherein spectral subtraction is performed in a recursive fashion until a mean power of the FFT periodogram is less than a predetermined level.

19. The system of claim 17, wherein the consistency check is performed on harmonics of each identified frequency.

20. The system of claim 17, wherein the frequency domain analysis module is configured to utilize a plurality of observation windows to monitor different ranges of impulse noise sources.

21. The system of claim 17, wherein the frequency analysis module is configured to perform sub-band analysis to perform a consistency check of all potential impulse noise sources.

22. The system of claim 17, wherein the frequency analysis module utilizes a plurality of thresholds to perform a consistency check based on harmonics of frequencies of potential impulse noise sources.

23. The system of claim 11, wherein the protection module comprises:
a suspender module configured to suspend updates to a frequency domain equalizer (FEQ), bit swapping, and seamless rate adaptation (SRA); and a timer module for tracking time based on DMT symbols, wherein the protection module is further configured to re-enable updates to the FEQ, bit swapping, and SRA when the timer module determines that a predetermined number of DMT symbols have been received.

24. A system comprising:
an impulse noise detector for detecting the presence of impulse noise;
and a frequency domain analysis module configured to perform analysis in the frequency domain to determine frequencies associated with the one or more impulse noise sources, wherein the frequency domain analysis module is further configured to:
define a range of frequencies in which to search for impulse noise sources;
divide the range of frequencies into a plurality of observation windows;
calculate an FFT periodogram across the plurality of observation windows; and
identify frequencies of impulse noise sources.

25. The system of claim 24, wherein for each identified frequency, the frequency domain analysis module is further configured to:
perform a multi-level threshold consistency check for each identified frequency based on the FFT periodogram across the plurality of observation windows, wherein the consistency check is performed to verify each identified frequency of impulse noise sources; and
perform spectral subtraction after the each identified frequency is verified to identify a next impulse noise source.

26. A system comprising:
an impulse noise detector for detecting the presence of impulse noise; and
a protection module for avoiding bit errors upon detection of impulse noise, wherein the protection module comprises:
a suspender module configured to suspend updates to a subset of: a frequency domain equalizer (FEQ), bit swapping, and seamless rate adaptation (SRA); and
a timer module for tracking time based on DMT symbols, wherein the protection module is further configured to re-enable updates to the FEQ, bit swapping, and SRA when the timer module determines that a predetermined number of DMT symbols have been received.

27. A system, comprising:
means for detecting whether impulse noise is present;
means for performing time domain analysis in response to detecting the presence of impulse noise;
means for performing frequency domain analysis to estimate frequencies associated with the one or more impulse noise sources;
means for providing a total number of impulse noise sources and frequencies associated with the impulse noise sources based on the time domain analysis and frequency domain analysis; and
means for suspending, in response to detecting the presence of impulse noise, updates to a subset of: a frequency domain equalizer (FEQ), bit swapping, and seamless rate adaptation (SRA).

* * * * *